United States Patent
Bullied et al.

(10) Patent No.: US 10,024,181 B2
(45) Date of Patent: Jul. 17, 2018

(54) CASTING OF THIN WALL HOLLOW AIRFOIL SECTIONS

(71) Applicant: United Technologies Corporation, Farmington, CT (US)

(72) Inventors: Steven J. Bullied, Pomfret Center, CT (US); Carl R. Verner, Windsor, CT (US); Steven D. Porter, Wethersfield, CT (US); James B. Park, Myrtle Beach, SC (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/286,081

(22) Filed: Oct. 5, 2016

(65) Prior Publication Data
US 2017/0081967 A1    Mar. 23, 2017

Related U.S. Application Data

(62) Division of application No. 13/617,723, filed on Sep. 14, 2012, now Pat. No. 9,486,853.

(51) Int. Cl.
*B22C 9/10* (2006.01)
*B22C 7/02* (2006.01)
(Continued)

(52) U.S. Cl.
CPC ............ *F01D 9/041* (2013.01); *B22C 7/02* (2013.01); *B22C 9/04* (2013.01); *B22C 9/10* (2013.01);
(Continued)

(58) Field of Classification Search
CPC .... B22C 7/02; B22C 9/04; B22C 9/10; B22C 9/108; B22C 9/24; B22D 25/02; B22D 29/00; B22D 29/001
(Continued)

(56) References Cited

U.S. PATENT DOCUMENTS 4,738,587 A    4/1988  Kildea
4,961,459 A   10/1990  Blazek
(Continued)

FOREIGN PATENT DOCUMENTS

EP    1611978 A1    1/2006
FR    2890878 A1    3/2007

OTHER PUBLICATIONS

Extended European Search Report, for European Patent Application No. 13837198.4, dated Sep. 22, 2015, 6 pages.
(Continued)

*Primary Examiner* — Kevin P Kerns
(74) *Attorney, Agent, or Firm* — Kinney & Lange, P.A.

(57) ABSTRACT

A casting mold assembly includes an airfoil defining section and a casting core. The airfoil defining section includes an outer mold wall and a direct-shelled inner mold wall. The direct-shelled inner mold wall is disposed within a forward chordwise portion of the airfoil defining section. The direct-shelled inner mold wall includes an aft end having an external radius measuring more than about 0.075 in. (1.9 mm). The casting core is secured within an aft chordwise portion of the airfoil defining section, and includes an aft end with an external radius measuring less than about 0.075 in. (1.9 mm). A cast component and a method for making the casting mold assembly are also disclosed.

9 Claims, 3 Drawing Sheets

(51) Int. Cl.
  *B22C 9/04* (2006.01)
  *B22C 9/24* (2006.01)
  *B22D 25/02* (2006.01)
  *B22D 29/00* (2006.01)
  *F01D 9/04* (2006.01)
  *F01D 5/18* (2006.01)

(52) U.S. Cl.
  CPC ............... *B22C 9/108* (2013.01); *B22C 9/24* (2013.01); *B22D 25/02* (2013.01); *B22D 29/001* (2013.01); *F01D 5/187* (2013.01); *F05D 2230/21* (2013.01); *F05D 2230/211* (2013.01); *Y02T 50/671* (2013.01); *Y02T 50/673* (2013.01); *Y02T 50/676* (2013.01)

(58) Field of Classification Search
  USPC .................. 164/516, 361, 45, 131, 132, 369
  See application file for complete search history.

(56) References Cited

U.S. PATENT DOCUMENTS

| | | |
|---|---|---|
| 4,987,944 A | 1/1991 | Parks |
| 5,050,665 A | 9/1991 | Judd |
| 5,291,654 A | 3/1994 | Judd et al. |
| 5,296,308 A | 3/1994 | Caccavale et al. |
| 5,623,985 A | 4/1997 | Wheaton et al. |
| 5,853,044 A | 12/1998 | Wheaton et al. |
| 5,950,705 A | 9/1999 | Huang |
| 5,960,249 A | 9/1999 | Ritter et al. |
| 7,172,012 B1 | 2/2007 | Memmen |
| 9,486,853 B2 * | 11/2016 | Bullied et al. ............ B22C 7/02 164/361 |
| 2007/0237638 A1 | 10/2007 | Sharma et al. |
| 2008/0099178 A1 | 5/2008 | Propheter-Hinckley et al. |
| 2009/0229780 A1 | 9/2009 | Skelley, Jr. et al. |
| 2010/0129195 A1 | 5/2010 | Surace et al. |
| 2011/0113627 A1 | 5/2011 | Alquier et al. |

OTHER PUBLICATIONS

Written Opinion and International Search Report, for PCT Patent Application No. PCT/US2013/059034, dated Nov. 27, 2013, 14 pages.

* cited by examiner

CASTING OF THIN WALL HOLLOW AIRFOIL SECTIONS

CROSS-REFERENCE TO RELATED APPLICATION(S)

This application is a divisional of U.S. application Ser. No. 13/617,723, filed Sep. 14, 2012, issued as U.S. Pat. No. 9,486,853, entitled "Casting of Thin Wall Hollow Airfoil Sections" by Steven J. Bullied, Carl R. Verner, Steven D. Porter, and James B. Park, the disclosure of which is incorporated by reference herein in its entirety.

BACKGROUND

Airfoils and other components for gas turbine engines, including those in the hot section, are investment cast. For hollow thin wall components without complex internal cooling schemes, using a casting core to form the entire hollow passage can introduce issues of manufacturing relating to the mismatch between pattern and core on the casting. However, there are casting and processing limitations on direct shelling of airfoil components with relatively small trailing edges.

SUMMARY

A casting mold assembly comprises an airfoil defining section and a casting core. The airfoil defining section includes an outer mold wall and a direct-shelled inner mold wall. The direct-shelled inner mold wall is disposed within a forward chordwise portion of the airfoil defining section. The direct-shelled inner mold wall includes an aft end having an external radius measuring more than about 0.075 in. (1.9 mm). The casting core is secured within an aft chordwise portion of the airfoil defining section, and includes an aft end with an external radius measuring less than about 0.075 in. (1.9 mm).

A cast component comprises an airfoil pressure sidewall, an airfoil suction sidewall, a hollow cavity, and a radially extending rib. The airfoil pressure and suction sidewalls each extend chordwise between a leading edge and a trailing edge. The hollow cavity is defined by respective inner surfaces of the airfoil pressure and suction sidewalls. The radially extending rib is disposed widthwise between the respective airfoil sidewall inner surfaces dividing the hollow cavity into a direct-shelled forward airfoil cavity and a core-shelled aft airfoil cavity. The direct-shelled forward airfoil cavity includes an aft end with an internal radius measuring more than about 0.075 in. (1.9 mm). The core-shelled aft airfoil cavity includes an aft end with an internal radius measuring less than about 0.075 in. (1.9 mm).

A method of making a casting mold assembly for a turbine component, the method comprises forming a casting pattern of the turbine component, the casting pattern having at least an airfoil defining section. A forward cavity and an aft cavity are formed into the casting pattern airfoil defining section. A refractory casting core is secured inside the airfoil defining section aft cavity. The refractory casting core has an aft end with an external radius measuring less than about 0.075 in. (1.9 mm). An outer surface of the casting pattern and an inner surface of the casting pattern forward cavity are shelled. The wall of the casting pattern forward cavity has an aft end with an internal radius measuring more than about 0.075 in. (1.9 mm) to define a casting mold assembly having at least an airfoil defining section including an outer wall, a direct-shelled inner wall, and the refractory casting core secured aft of the direct-shelled inner wall.

DETAILED DESCRIPTION

Figure 1:
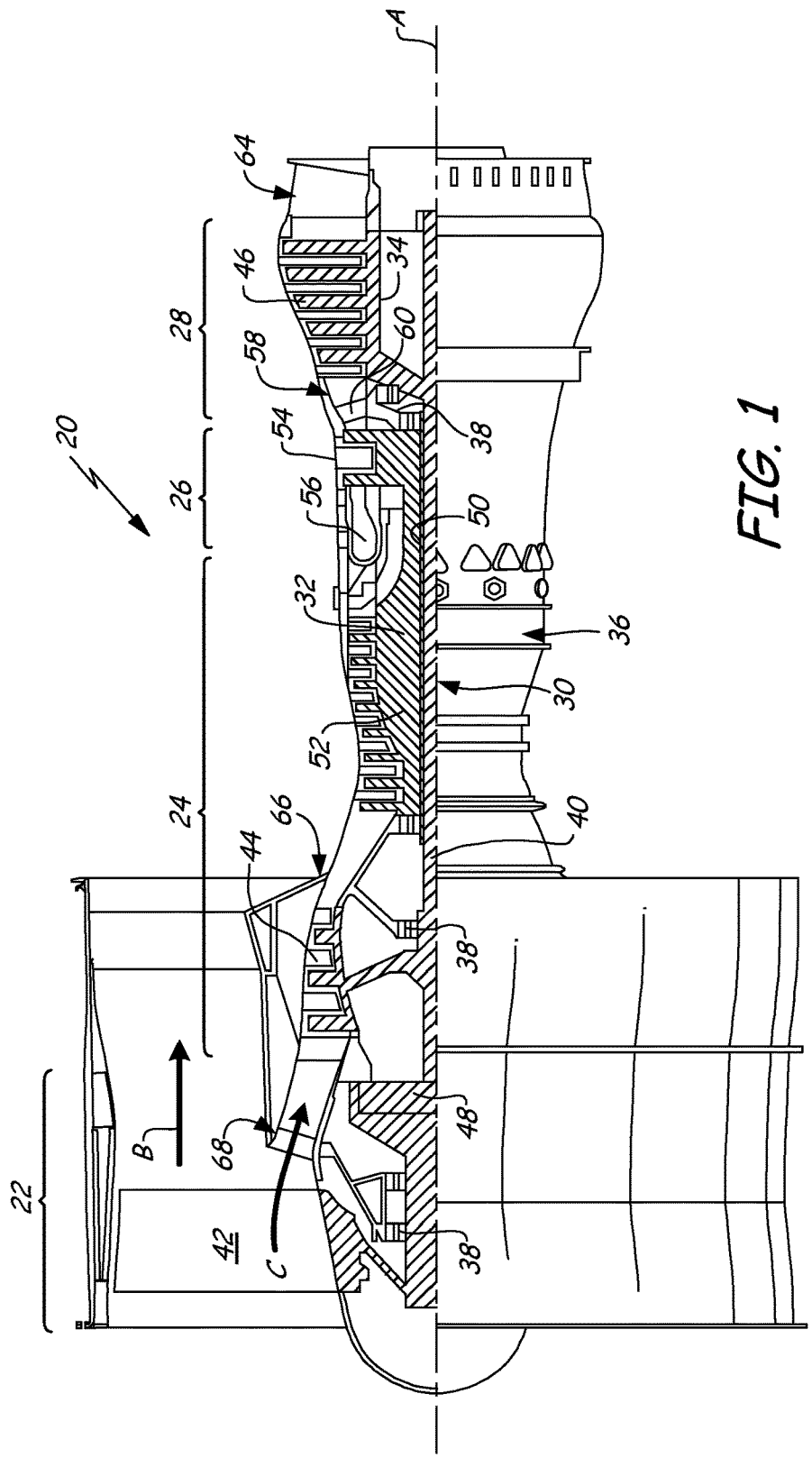
FIG. 1 is a schematic cross-sectional view of a turbofan gas turbine engine according to the present description.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass ($lb_m$) of fuel per hour being burned divided by pound-force ($lb_f$) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}° R)/518.7)^{0.5}]$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

A number of cases include inner and outer sections connected by struts extending through the core flow path C. Several non-limiting examples of such cases include mid-turbine frame 58, turbine exhaust case 64, front centerbody case 66, or fan intermediate case 68. Airfoils (e.g., mid-turbine frame vanes 60) or airfoil-shaped fairings can be placed over these struts and associated service lines to guide core flow C therearound. The following describes a non-limiting example of a casting and a casting mold adaptable for use in these and other sections of engine 20.

Figure 2A:
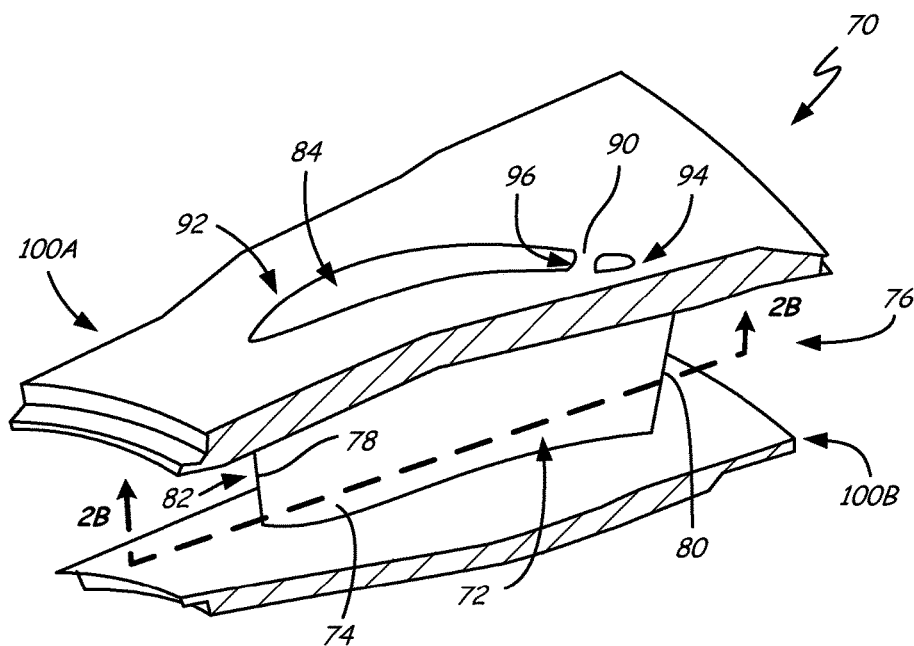
FIG. 2A shows an example cast vane segment for the turbofan engine.
Figure 2B:
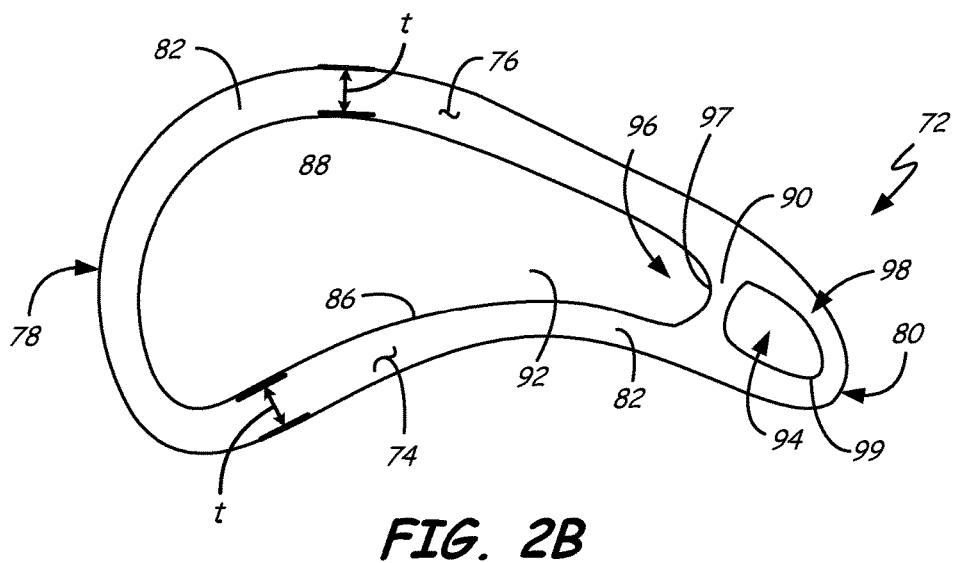
FIG. 2B is a cross-section taken chordwise through an airfoil section of the cast vane segment shown in FIG. 2A.

FIG. 2A shows cast vane segment 70 for a turbofan engine. FIG. 2B is a cross-section taken chordwise through airfoil section 72 of cast vane segment 70 shown in FIG. 2A. FIGS. 2A and 2B also include pressure sidewall 74, suction sidewall 76, leading edge 78, trailing edge 80, forward airfoil wall section 82, airfoil cavity 84, pressure sidewall inner surface 86, suction sidewall inner surface 88, rib 90, forward airfoil cavity 92, aft airfoil cavity 94, forward cavity aft end 96, forward cavity aft end internal radius 97, aft airfoil cavity aft end 98, aft airfoil cavity aft end internal radius 99, and vane platform sections 100A, 100B.

Cast vane segment 70 includes airfoil section 72 with pressure sidewall 74 and suction sidewall 76 each extending chordwise between leading edge 78 and trailing edge 80. Forward airfoil wall section 82 can include leading edge 78 and forward portions of pressure sidewall 74 and suction sidewall 76. Airfoil cavity 84 can be divided by radially extending rib 90, which is disposed widthwise between respective pressure sidewall inner surface 86 and suction sidewall inner surface 88. Rib 90 divides hollow cavity 84 into forward airfoil cavity 92 and aft airfoil cavity 94. In certain of these embodiments, rib 90 can be disposed aft of a midchord position of airfoil section 72 while still being positioned to permit direct shelling with a sufficiently large radius of forward cavity aft end 96 as explained below.

Forward airfoil cavity 92 can be a single cavity extending chordwise from adjacent leading edge 78 to forward cavity aft end 96, and widthwise between airfoil suction sidewall 76 and airfoil pressure sidewall 74. Aft end 96 of forward airfoil cavity 92 can have internal radius 97 measuring more than about 0.075 in. (1.9 mm), while aft airfoil cavity 94 can include aft end 98 with internal radius 99 measuring less than about 0.075 in. (1.9 mm). In certain embodiments, aft airfoil cavity 94 can include aft end 98 disposed proximate airfoil trailing edge 80. In certain of these embodiments, internal radius 99 of aft end 98 can measure at least about 0.025 in. (0.6 mm). In one non-limiting example, internal radius 97 of aft end 96 measures about 0.125 in. (3.2 mm), while internal radius 99 of aft end 98 measures about 0.040 in. (1.0 mm).

Forward airfoil cavity 92 can be cast using a mold with direct-shelled inner and outer mold walls defining forward airfoil wall section 82. Direct-shelled inner and outer mold walls (shown below) are shelled over a pattern of the component to form the casting mold. Aft cavity 94 can be core-shelled, where the inner mold wall can be defined by a refractory casting core secured within the pattern prior to shelling of the outer wall. This geometry of airfoil section 72 utilizes a casting mold assembly and method, both of which improve repeatability, simplify processing, and reduce lead time.

In certain embodiments, thickness t of forward airfoil wall section 82 can vary around the perimeter of forward airfoil cavity 92. In certain of these embodiments, thickness t can vary within a range between about 0.050 inches (1.3 mm) and about 0.095 inches (2.4 mm) along airfoil suction sidewall 76 and airfoil pressure sidewall 74 forward of rib 90. In yet certain of these embodiments, depending on the use of cast vane segment 70, leading edge 78 can have increased thickness t (e.g., more than about 0.100 inches/2.5 mm) if needed to prevent burn-through from hot combustion gases. Alternatively, the thickness t of forward airfoil wall section 82 can be substantially constant along a chordwise extent of airfoil section 72 between leading edge 78 and forward cavity aft end 96.

Cast vane segment 70 can optionally include at least one platform section 100A, 100B disposed at opposed radial ends of airfoil section 72. In certain embodiments, one or both platform sections 100A, 100B can be cast integrally with airfoil pressure sidewall 74 and suction sidewall 76. In one such non-limiting example, vane segment 70 can be a stator segment for a low-pressure turbine stage 46 of gas turbine engine 20 (shown in FIG. 1). In certain of those embodiments, the low-pressure turbine stator stage is an inlet stage disposed in mid-turbine frame 58 (shown in FIG. 1), in which case airfoil section 72 corresponds to vane 60. It will be appreciated that embodiments of cast vane segment 70 can alternatively be used in other applications having thin airfoil walls. In other non-limiting examples, cast vane segment 70 can be adapted for use as a single-piece airfoil shaped fairing. Airfoil shaped fairings can be used over struts extending through the core gas path C, with non-limiting examples including a turbine exhaust case 64, front centerbody case 66, or fan intermediate case 68 (shown in FIG. 1). An example casting core assembly and method are described with respect to FIGS. 3A and 3B.

Figure 3A:
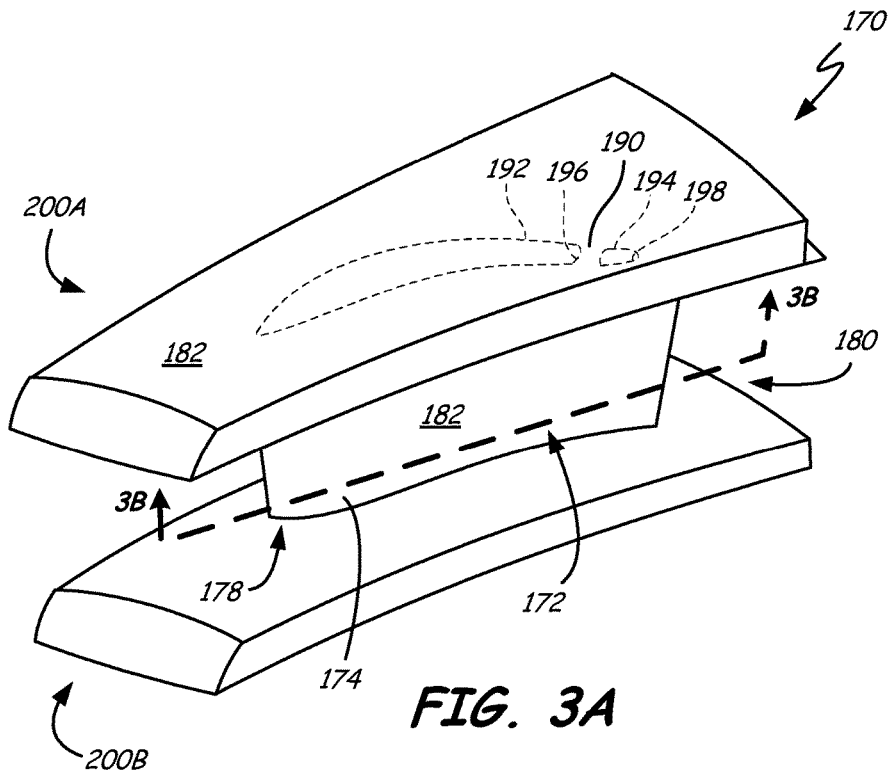
FIG. 3A isometrically depicts a mold assembly for casting the vane segment.
Figure 3B:
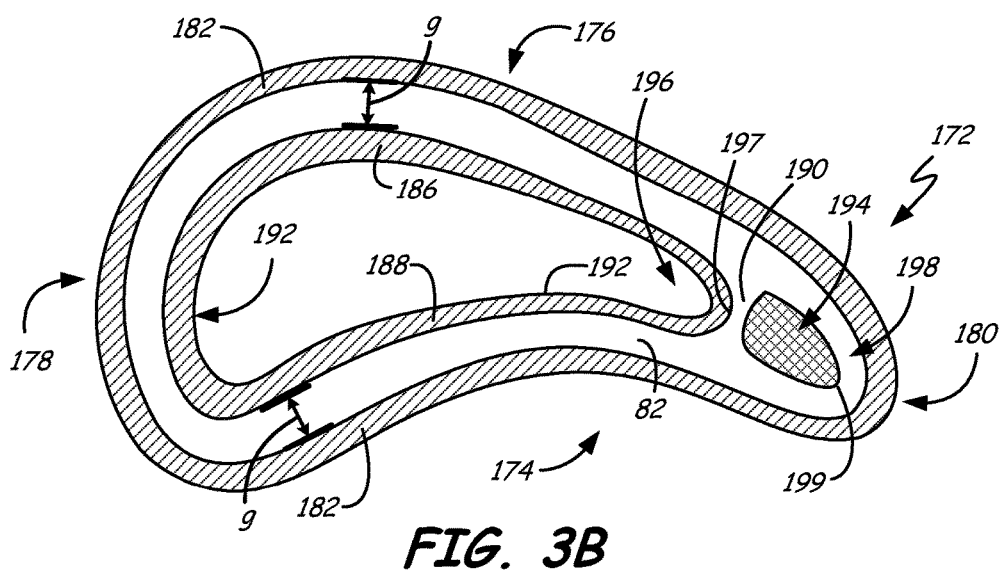
FIG. 3B is a cross-section taken chordwise through an airfoil defining section of the casting mold assembly shown in FIG. 3A.

FIG. 3A shows example mold assembly 170 for casting vane segment 70 (shown in FIGS. 2A and 2B). FIG. 3B is a cross-section taken chordwise through mold assembly airfoil defining section 172 shown in FIG. 3A. FIGS. 3A and 3B also include pressure sidewall mold portion 174, suction sidewall mold portion 176, leading edge mold portion 178, trailing edge mold portion 180, outer mold wall 182, pressure sidewall inner surface 186, suction sidewall inner surface 188, rib mold portion 190, direct-shelled inner mold wall 192, aft casting core 194, inner mold wall aft end 196, inner mold wall aft end external radius 197, aft casting core aft end 198, aft casting core aft end external radius 199, and vane platform mold sections 200A, 200B.

Casting mold assembly 170 can include at least casting mold airfoil defining section 172. Casting mold airfoil defining section 172 includes pressure sidewall portion 174 and suction sidewall portion 176 each extending chordwise between leading edge portion 178 and trailing edge portion 180. Outer mold wall 182 defines at least an outer airfoil surface around these respective portions 174, 176, 178, and 180 of airfoil defining section 172.

Direct-shelled inner mold wall 192 can be disposed within a forward chordwise portion of airfoil defining section 172. In one example, inner mold wall 192 is disposed forward of rib portion 190, and thus can include inner mold wall surfaces of pressure sidewall portion 174, suction sidewall portion 176, and leading edge portion 178. Pressure sidewall portion 174 and suction sidewall portion 176 can be contiguous with leading edge portion 178 and/or aft end portion 196 forward of trailing edge portion 180. Aft end portion 196 of direct-shelled inner mold wall 192 can have external radius 197 measuring more than about 0.075 in. (1.9 mm).

Casting core 194 can be secured within an aft chordwise portion of airfoil defining section 172, for example aft of rib portion 190. Casting core 194, which may be any standalone ceramic or metal refractory element suitable for use in a casting mold, can include aft end 198 with external radius 199 measuring less than about 0.075 in. (1.9 mm). In certain of these embodiments, internal radius 99 of aft end 98 can measure at least about 0.025 in. (0.6 mm). In one non-limiting example, external radius 197 of direct-shelled inner mold wall aft end 196 measures about 0.125 in. (3.2 mm), while external radius 199 of core aft end 198 measures about 0.040 in. (1.0 mm).

Casting mold assembly 170 can also optionally include at least one platform section 200A, 200B at opposed radial ends of mold airfoil defining section 172. In certain embodiments, one or both platform sections 200A, 200B can be shelled integrally with casting mold pressure and sidewall portions 176 as well as leading edge portion 178.

As noted above, portions 174, 176, 178 of direct-shelled inner mold wall 192 can be contiguous with one another and with inner mold wall aft end portion 196. As such, these contiguous walls can define a single chordwise boundary of inner mold wall 192. In certain embodiments, outer mold wall 182 and the contiguous inner mold wall are separated by a continuously varying gap distance g through at least one of the inner suction sidewall portion and the inner pressure sidewall portion. This gap distance corresponds to a generally constant thickness t of wall 82 (shown in FIGS. 2A and 2B). In certain of these embodiments, gap distance g can vary within a range between about 0.050 inches (2.0 mm) and about 0.095 inches (2.4 mm) forward of rib portion 190. In yet certain of these embodiments, depending on the use of cast vane segment 70 (shown in FIGS. 2A and 2B), leading edge portion 178 can have increased gap distance g (e.g., more than about 0.100 inches/2.5 mm) if needed to increase the casting wall thickness for preventing burn-through around the leading edge. Alternatively, the gap distance g can be substantially constant around the perimeter of inner mold wall 192 forward of rib portion 190.

In certain cases, direct shelling of an entire airfoil cavity from the leading edge to the trailing edge can reduce overall part lead time. Direct shelling of an inner mold wall extending from the leading edge to the trailing edge can also reduce tolerance stackup often seen with casting cores. Tolerance stacking can be increased due to potential misalignment from an added step of securing a large casting core into a casting pattern before shelling the mold over the pattern.

However, an inner mold wall that has a small curvature radius (e.g., less than about 0.075 in./1.9 mm) is more difficult to direct shell as the aft end of the direct shelled wall approaches the trailing edge. In such cases, the external trailing edge radius would have to be increased to accommodate sufficient curvature for a direct shelled inner mold wall, which then affects aerodynamic performance and adds weight. Where it is not practical to increase the trailing edge size, the aft end of a direct-shelled hollow cavity could be moved forward to maintain a smaller trailing edge external radius and a sufficiently large radius at the aft end of the internal cavity. This leaves a solid trailing edge portion that is too massive for reliable casting even with a small external radius. Increased mass of the resultant solid trailing edge induces large amounts of shrinkage and porosity within stress critical areas, because thin airfoil walls solidify before the solid trailing edge. Casting problems caused by a solid trailing edge can be exacerbated in combination with thin airfoil walls. In addition, an uncored large trailing edge radius can also affect the structural properties of the finished airfoil. Such a large, solid trailing edge can provide too strong of a thermal punch load into inner and outer platforms.

Thus, casting mold assembly 170 can include airfoil defining section 172 with a direct-shelled inner mold wall 192 and a refractory core 194 aft of direct-shelled inner mold wall 192 to improve casting repeatability and reduce final processing resources. Casting mold rib portion 190 can be disposed aft of a midchord position of casting mold airfoil defining section 192, while still being positioned to permit direct shelling of forward inner mold wall 192 with a sufficiently large radius 197. Casting core 194 can include aft end 198 disposed adjacent to trailing edge portion 180 of casting mold airfoil defining section 172. This reduces the mass of the resultant trailing edge 80 (shown in FIGS. 2A-2B) to prevent shrinkage and porosity, allowing it to solidify along with thin airfoil walls, such as forward airfoil wall portion 82 (also shown in FIGS. 2A-2B).

A component having an airfoil section with a combination of thin airfoil walls and a small trailing edge can be produced reliably, consistently, and simply, by adopting various embodiments of this casting mold assembly. With this type of casting geometry, a direct-shelled forward airfoil cavity retains a sufficiently large radius for ease of direct shelling a significant portion of the cavity, allowing the aft end of the forward airfoil cavity to be blended internally to match required tolerances. And with a core-shelled cavity disposed aft of the forward cavity, the casting weight of the trailing edge can be reduced to be more in line with the forward airfoil walls. By limiting the use of a refractory core to a localized (aft) area, any mismatch caused by misalignment of the core with the pattern also localizes tolerance stack up to the small trailing edge region. Thus, only the trailing edge region needs to be hand-blended after casting. Further, the aft core-shelled cavity allows the blending to be performed on the exterior airfoil surfaces to meet overall tolerances, whereas direct shelling of a small trailing edge region would require blending to be performed from the cramped inner surfaces of the cast airfoil.

Casting mold assembly 170 for casting vane segment 70 can be made by adapting the following process to specific designs. A casting pattern of the turbine component is formed with at least an airfoil defining section. In this example, the casting pattern is a model or replica of a finished casting, such as is seen in FIGS. 2A and 2B. The casting pattern, which may be formed from wax or another inexpensive sacrificial material, can include a forward cavity and an aft cavity of the airfoil defining section. Forming of one or both cavities steps may be done separately or simultaneously with forming the airfoil defining section, such as by injection molding the wax into a die. Alternatively, one or both cavities may be formed into the pattern after forming the airfoil defining section.

A refractory casting core can then be secured inside the aft cavity of the casting pattern airfoil defining section. The core, which defines an aft cavity of the casting, can be any suitable refractory material including ceramics and refractory metals. The refractory casting core may be solid or hollow, and can include an aft end with an external radius measuring less than about 0.075 in. (1.9 mm).

An outer surface of the casting pattern and can then be shelled using a refractory shelling compound (e.g., a ceramic slurry) to form an outer mold wall. An inner surface of the casting pattern forward cavity can also be shelled to form a forward inner mold wall. The inner mold wall of the casting pattern forward cavity can include an aft end with an internal radius measuring more than about 0.075 in. (1.9 mm).

Once the outer mold wall and the forward inner mold wall are formed over the casting pattern, the wax casting pattern can then be destroyed by melting or other conventional means. This leaves a casting mold assembly having at least an airfoil defining section including an outer wall, a direct-shelled inner wall, and the refractory casting core secured aft of the direct-shelled inner wall.

In certain embodiments, at least one casting pattern platform section is integrally formed with the casting pattern airfoil defining section. In these embodiments, the shelling and destroying steps result in a casting mold assembly having at least one corresponding casting mold platform section integrally formed with the casting mold airfoil defining section. An example embodiment of a casting mold made according to this method is shown in FIGS. 3A and 3B.

After the casting mold is recovered, it can be used for making a cast turbine component. The casting mold assembly can be made according to various embodiments of the above method. A molten metal alloy can then be poured into the spaces of the casting mold assembly previously occupied by the destroyed casting pattern. The molten metal alloy is then solidified to form a cast turbine component having at least an airfoil section before destructively removing the casting mold and the casting core. The resulting airfoil section of the cast component includes a direct-shelled forward cavity having an internal radius measuring more than about 0.075 in. (1.9 mm), and a core-shelled aft cavity having an internal radius less than about 0.075 in. (1.9 mm), such as is shown in FIGS. 2A and 2B.

Discussion of Possible Embodiments

A casting mold assembly according to an exemplary embodiment of this disclosure, among other possible things, includes an airfoil defining section including an outer mold wall, and a direct-shelled inner mold wall disposed within a forward chordwise portion of the airfoil defining section, the direct-shelled inner mold wall including an aft end having an external radius measuring more than about 0.075 in. (1.9 mm); and a casting core secured within an aft chordwise portion of the airfoil defining section, the casting core including an aft end with an external radius measuring less than about 0.075 in. (1.9 mm).

The casting mold assembly of the preceding paragraph can optionally include, additionally and/or alternatively, any one or more of the following features, configurations and/or additional components:

A further embodiment of the foregoing casting mold assembly, wherein the aft end of the direct-shelled inner mold wall is additionally and/or alternatively disposed aft of a midchord position of the casting mold airfoil defining section.

A further embodiment of any of the foregoing casting mold assemblies, wherein the direct-shelled inner mold wall additionally and/or alternatively includes an inner suction sidewall portion and an inner pressure sidewall portion contiguous with the aft end.

A further embodiment of any of the foregoing casting mold assemblies, wherein the direct-shelled inner mold wall additionally and/or alternatively includes a leading edge portion integral with the inner suction sidewall portion and the inner pressure sidewall portion.

A further embodiment of any of the foregoing casting mold assemblies, wherein the contiguous respective leading edge portion, inner suction sidewall portion, inner pressure sidewall portion, and aft wall additionally and/or alternatively define a single inner boundary of a forward airfoil cavity.

A further embodiment of any of the foregoing casting mold assemblies, wherein the outer mold wall and the direct-shelled inner mold wall are additionally and/or alternatively separated by a substantially constant distance through at least one of the leading edge portion, inner suction sidewall portion, and inner pressure sidewall portion.

A further embodiment of any of the foregoing casting mold assemblies, wherein the aft end of the casting core is additionally and/or alternatively disposed internally adjacent to a trailing edge portion of the outer mold wall.

A further embodiment of any of the foregoing casting mold assemblies, the casting mold assembly additionally and/or alternatively further comprising at least one platform section at one of a first radial end and a second radial end of the casting mold, the platform section contiguous with at least the mold outer wall and the direct-shelled inner mold wall.

A further embodiment of any of the foregoing casting mold assemblies, wherein the casting core aft end additionally and/or alternatively has an external radius measuring at least about 0.025 in. (0.6 mm).

A cast component according to an exemplary embodiment of this disclosure, among other possible things, includes an airfoil pressure sidewall extending chordwise between a leading edge and a trailing edge; an airfoil suction sidewall extending chordwise between the leading edge and the trailing edge; a hollow cavity defined by respective inner surfaces of the airfoil pressure and suction sidewalls; and a radially extending rib disposed widthwise between the respective airfoil sidewall inner surfaces, the rib dividing the hollow cavity into a direct-shelled forward airfoil cavity including an aft end with an internal radius measuring more than about 0.075 in. (1.9 mm), and a core-shelled aft airfoil cavity including an aft end with an internal radius measuring less than about 0.075 in. (1.9 mm).

The cast component of the preceding paragraph can optionally include, additionally and/or alternatively, any one or more of the following features, configurations and/or additional components:

A further embodiment of the foregoing cast component, wherein the rib is additionally and/or alternatively disposed aft of a midchord position of the cast component.

A further embodiment of any of the foregoing cast components, wherein the direct-shelled forward airfoil cavity is additionally and/or alternatively a single hollow cavity extending chordwise from adjacent the leading edge, and widthwise between the airfoil pressure sidewall and the airfoil suction sidewall.

A further embodiment of any of the foregoing cast components, wherein the aft end of the core-shelled aft airfoil cavity is additionally and/or alternatively disposed proximate the airfoil trailing edge.

A further embodiment of any of the foregoing cast components, the cast component additionally and/or alternatively further comprising at least one platform section integrally cast with the airfoil pressure and suction sidewalls.

A further embodiment of any of the foregoing cast components, wherein the cast component is additionally and/or alternatively a vane segment for a low-pressure turbine stator of a gas turbine engine.

A method for making a casting mold assembly according to an exemplary embodiment of this disclosure, among other possible things, includes forming a casting pattern of the turbine component, the casting pattern having at least an airfoil defining section; forming a forward cavity and an aft cavity into the casting pattern airfoil defining section; securing a refractory casting core inside the airfoil defining section aft cavity, the refractory casting core having an aft end with an external radius measuring less than about 0.075 in. (1.9 mm); and shelling an outer surface of the casting pattern and an inner surface of the casting pattern forward cavity, the wall of the casting pattern forward cavity having an aft end with an internal radius measuring more than about 0.075 in. (1.9 mm), defining a casting mold assembly having at least an airfoil defining section including an outer wall, a direct-shelled inner wall, and the refractory casting core secured aft of the direct-shelled inner wall.

The method of the preceding paragraph can optionally include, additionally and/or alternatively, any one or more of the following features, configurations, steps, and/or additional components:

A further embodiment of any of the foregoing methods, the method additionally and/or alternatively further comprising forming a casting pattern platform section integral with the casting pattern airfoil defining section, wherein the shelling and step results in a casting mold assembly having a casting mold platform section integrally formed with the casting mold airfoil defining section.

A method for making a cast turbine component comprises making a casting mold assembly according to any of the foregoing methods, pouring a molten metal alloy into the spaces of the casting mold assembly previously occupied by the casting pattern, solidifying the molten metal alloy to form the cast turbine component; and destructively removing the casting mold assembly including the casting core to recover the solidified cast turbine component.

A further embodiment of any of the foregoing methods, wherein the cast turbine component additionally and/or alternatively includes at least one platform portion integrally cast with the airfoil section.

A cast turbine component may optionally be made according to any of the foregoing methods.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a casting mold assembly for a turbine component, the method comprising:
   forming a casting pattern of the turbine component, the casting pattern having at least an airfoil defining section;
   forming a forward cavity and an aft cavity into the casting pattern airfoil defining section;

securing a refractory casting core inside the airfoil defining section aft cavity such that the casting core is disposed aft of the aft end of a direct-shelled inner mold wall, defining a rib mold portion of the airfoil defining section aft of a midchord position, the refractory casting core having an aft end with an external radius measuring less than about 0.075 in. (1.9 mm); and shelling an outer surface of the casting pattern and an inner surface of the casting pattern forward cavity, the wall of the casting pattern forward cavity having an aft end with an internal radius measuring more than about 0.075 in. (1.9 mm), to define a casting mold assembly having at least an airfoil defining section including an outer mold wall, a direct-shelled inner mold wall, and the refractory casting core secured aft of the direct-shelled inner mold wall;

wherein the rib mold portion extends radially through the casting mold between the direct-shelled inner mold wall and the casting core.

2. The method of claim 1, further comprising:

forming a casting pattern platform section integral with the casting pattern airfoil defining section;

wherein the shelling step results in a casting mold assembly having a casting mold platform section integrally formed with the casting mold airfoil defining section.

3. A method for making a cast turbine component, the method comprising:

making a casting mold assembly according to the method of claim 1;

pouring a molten metal alloy into spaces of the casting mold assembly previously occupied by the casting pattern;

solidifying the molten metal alloy to form the cast turbine component; and destructively removing the casting mold assembly, including the casting core, to recover the solidified cast turbine component.

4. The method of claim 3, wherein the cast turbine component also includes at least one platform portion integrally cast with the airfoil section.

5. The method of claim 1, wherein the shelled inner mold wall also includes an inner suction sidewall portion and an inner pressure sidewall portion contiguous with the aft end.

6. The method of claim 5, wherein the shelled inner mold wall also includes a leading edge portion integral with the inner suction sidewall portion and the inner pressure sidewall portion.

7. The method of claim 6, wherein the leading edge portion, inner suction sidewall portion, inner pressure sidewall portion, and aft wall are contiguous and define a single inner boundary of a forward airfoil cavity.

8. The method of claim 6, wherein the outer mold wall and the direct-shelled inner mold wall are separated by a constant distance through at least one of the leading edge portion, inner suction sidewall portion, and inner pressure sidewall portion.

9. The method of claim 1, wherein the casting core aft end has an external radius measuring at least about 0.025 in. (0.6 mm).

* * * * *